(12) United States Patent
Spence et al.

(10) Patent No.: US 7,421,785 B2
(45) Date of Patent: Sep. 9, 2008

(54) METHOD FOR CLEARANCE ADJUSTING COVER PLATE CLOSURE

(75) Inventors: Dale A. Spence, St. Louis, MO (US); George Schmidt, St. Louis, MO (US); Glen Parker, St. Peters, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 589 days.

(21) Appl. No.: 11/111,644

(22) Filed: Apr. 21, 2005

(65) Prior Publication Data

US 2005/0235476 A1 Oct. 27, 2005

Related U.S. Application Data

(60) Provisional application No. 60/564,085, filed on Apr. 21, 2004.

(51) Int. Cl.
*B23P 11/00* (2006.01)
*F16C 11/06* (2006.01)

(52) U.S. Cl. ............. 29/898.051; 29/441.1; 29/509; 29/283.5; 403/122; 403/135

(58) Field of Classification Search ............ 29/898.051, 29/898.1, 441.1, 522.1, 283.5, 509; 403/76, 403/122, 132, 135, 282, 285
See application file for complete search history.

(56) References Cited

U.S. PATENT DOCUMENTS

| | | | |
|---|---|---|---|
| 1,561,872 A | 11/1925 | Lovejoy | |
| 1,641,269 A | 9/1927 | Hoke | |
| 3,376,058 A | 4/1968 | Herbenar | 287/90 |
| 3,413,023 A | 11/1968 | Herbenar | 287/87 |
| 4,259,027 A * | 3/1981 | Hata | 403/132 |
| 4,431,328 A | 2/1984 | Smith | 403/36 |
| 4,871,276 A | 10/1989 | Fister et al. | 403/162 |
| 4,875,794 A * | 10/1989 | Kern, Jr. | 403/132 |
| 5,704,727 A | 1/1998 | Atkins et al. | 403/135 |
| 6,125,541 A | 10/2000 | Parker | 29/898.051 |
| 6,202,280 B1 | 3/2001 | Parker | 29/441.1 |
| 6,532,665 B2 | 3/2003 | Parker | 29/898.051 |
| 6,619,873 B2 | 9/2003 | Parker | 403/135 |

* cited by examiner

*Primary Examiner*—Jermie E Cozart
(74) *Attorney, Agent, or Firm*—Robert L. Stearns; Dickinson Wright PLLC

(57) ABSTRACT

A ball and socket housing incorporating a thick housing wall of deformable material adjacent a central bore opening to provide a closure system utilizing a deformable cover-plate. The deformable cover-plate is formed to a desired configuration within the central bore to achieve a consistent internal socket preload. The cover-plate is deformed into the housing opening beyond an elastic limit to control resiliency or spring-back characteristics, thereby achieving a high-degree of repeatability and precise control of the ball and socket preload during the assembly process. The deformed cover-plate is retained in the socket housing at the cover-plate seat by swaged or rolling the perimeter of the housing to capture the perimeter of the deformed cover plate within the housing central bore opening.

12 Claims, 5 Drawing Sheets

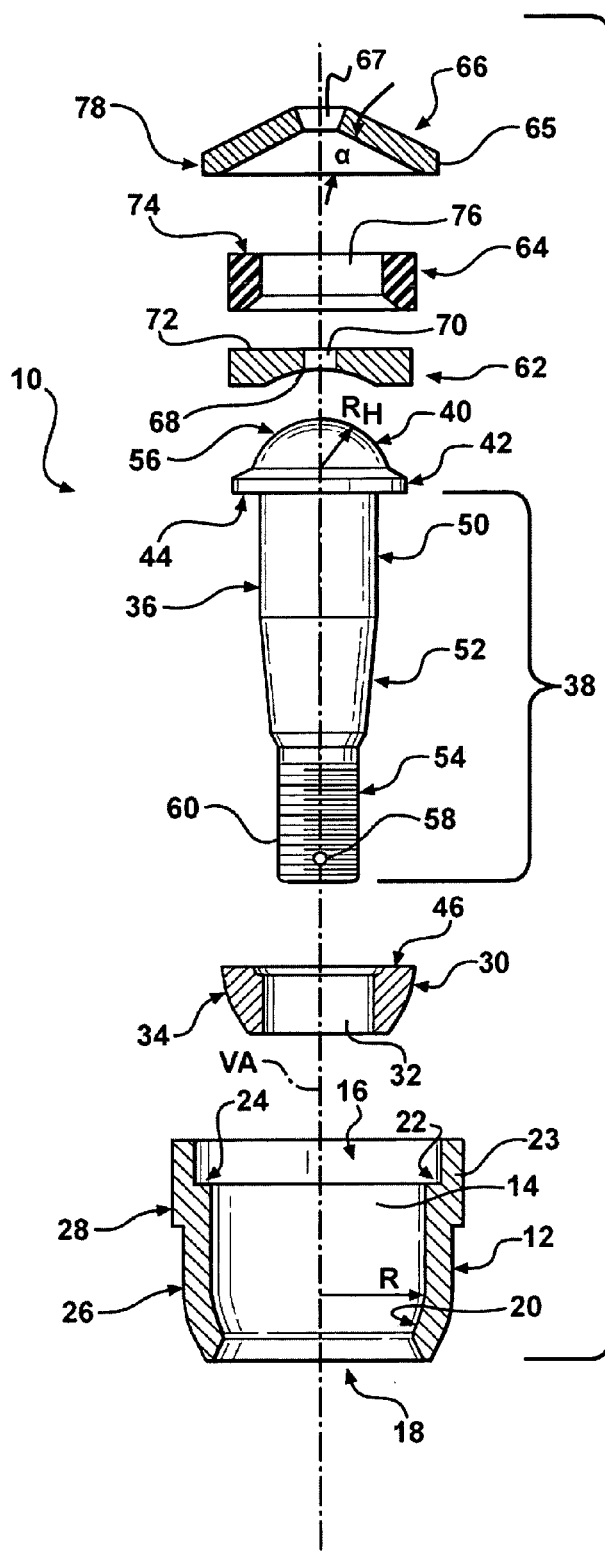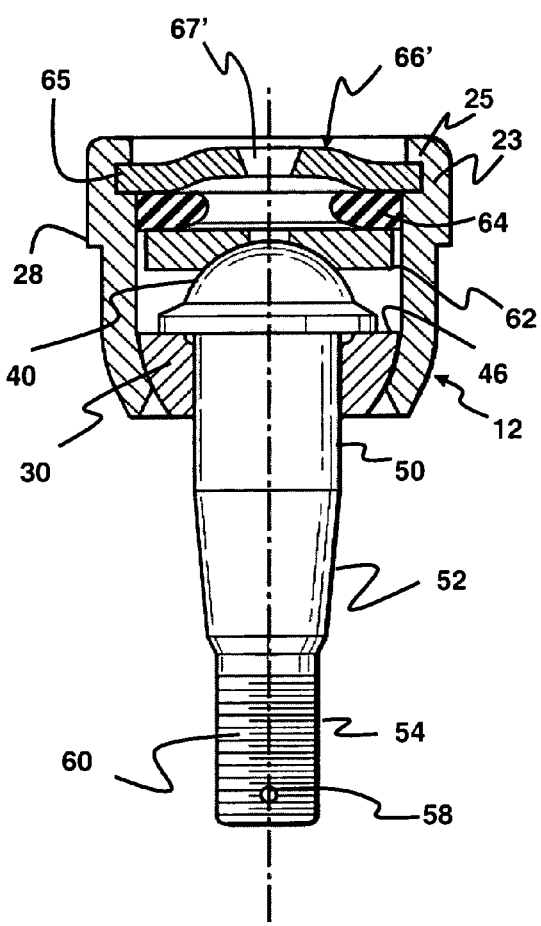
FIG. 1
FIG. 2

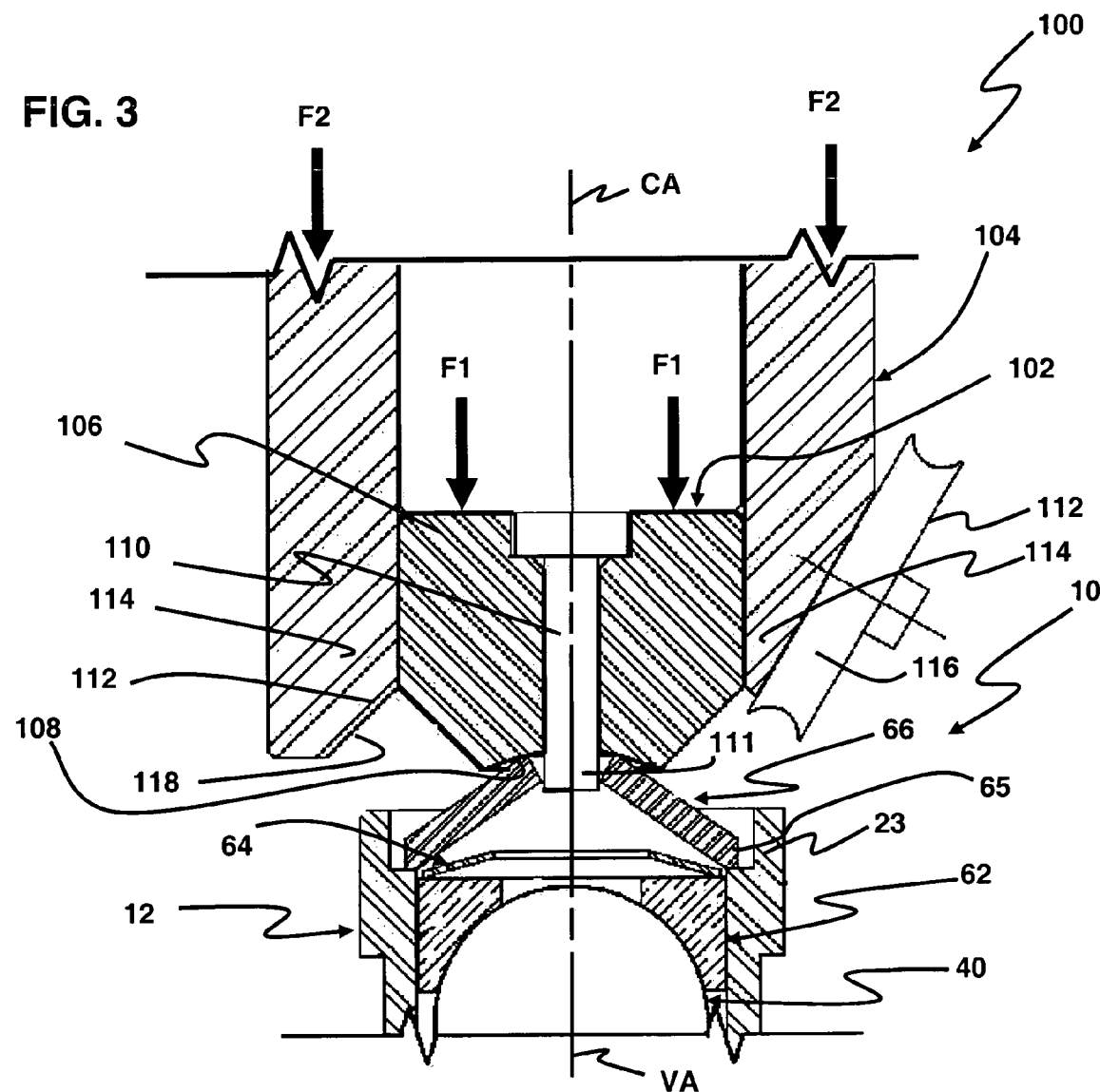

METHOD FOR CLEARANCE ADJUSTING COVER PLATE CLOSURE

CROSS-REFERENCES TO RELATED APPLICATIONS

This patent application claims priority to U.S. Provisional Patent Application Ser. No. 60/564,085, filed Apr. 21, 2004, which is hereby incorporated herein by reference in its entirety.

BACKGROUND OF THE INVENTION

1. Technical Field

This invention relates to the manufacturing and assembly of movable sockets, for example, ball-joints as used in automotive steering and suspension systems, and more particularly, to a method and device for performing the operation of closing one end of a movable socket by deforming a solid cover-plate and then spinning or swaging a perimeter lip of the housing to retain the deformed cover-plate. While the invention is described in detail with respect to automotive applications, those skilled in the art will recognize the broader applicability of the invention.

2. Related Art

Conventional ball-joints, and other movable sockets are used, for example, in automotive steering and suspension applications. The sockets typically comprise a housing having a circular cylindrical internal surface, a ball stud with a ball head contained in the housing, and a bearing member supporting the ball head within the housing. These components are typically installed into the housing through a posterior opening, with the ball stud extending outward through an axially disposed anterior opening of a smaller diameter than the ball head. Traditionally, the posterior opening is closed by means of a flat cover-plate, which is spun or swaged in place. Alternatively, the cover-plate may be welded into place. In such sockets the control of the preload of the socket components through pressure applied by the cover-plate in conjunction with closure of the socket is very important to the proper function of the socket in its intended application.

Cover-plate elements are traditionally formed from a stamping process, whereby individual components having desired dimensions are stamped from metal sheets. Either during the stamping process or in a subsequent manufacturing step, a raised boss may be drawn or stamped into the cover-plate, and a centrally located hole of predetermined dimensions punched therein to receive a self-tapping or threaded grease fitting. Once secured in place, the cover-plate presses on the bearing member either directly, or indirectly through a resilient intermediate component and a pressure plate or bearing member.

Once assembled, movable sockets may be utilized as position controlling, load carrying members in numerous mechanical systems, including automotive vehicle suspension and steering systems. Obviously, movable sockets or ball-joints employed in these applications are subjected to various operating conditions, and may be required to carry substantial loads. When wear develops, the performance of the movable socket or ball-joint degrades and, in the case of automotive applications, may result in erratic steering or excessive looseness and play in the vehicle suspension system.

As described in U.S. Pat. No. 6,202,280 B1, herein incorporated by reference, a method and device for expanding a conical or convex cover-plate within a circumferential groove in the posterior opening may be employed to secure and enclose the socket components within the socket housing, allowing for closure of a fully hardened housing without the need for additional steps to close the socket and secure the cover-plate.

Alternately, as is described in U.S. Pat. No. 6,125,541 to Parker, herein incorporated by reference, a two-stage ram having first and second contact surfaces may be utilized to first expand a conical or convex wear-indicator style cover-plate, having an axial opening, within the circumferential groove in the posterior opening of a housing, and then to further deform the cover-plate to a predetermined final position relative to the internal components of the socket to provide a predetermined wear indicator distance.

Similarly, as is described in U.S. Pat. No. 6,532,665 B2 to Parker, herein incorporated by reference, a two-stage ram having a contact surface and a concentric pivot punch may be brought into engagement with the cover-plate within the posterior opening of a housing for the purpose of closing the housing. Pressure exerted by the two-stage ram is transferred to the cover-plate through the contact surface, expanding the cover-plate to conform to the contact surface and enclosing the internal components of the socket within the socket housing. The exerted pressure additionally results in the extension of the concentric pivot punch into the central orifice of the cover-plate, thereby controlling the expansion of the cover-plate and establishing the central orifice to predetermined dimensions upon closure of the socket housing.

Each of the aforementioned sockets and apparatuses and methods for closing a movable socket with a ram requires that the cover-plate incorporate an axial opening to permit the desired deformation under load from the ram. However, some socket designs require a sealed or closed cover-plate having no axial opening. In many such applications, the socket is lubricated only prior to the assembly process, and is not lubricated after assembly. These are often referred to as "lubed for life" sockets. U.S. Pat. No. 6,619,873 B2 to Parker, herein incorporated by reference, sets forth and describes an assembly technique for expanding a sealed or closed cover plate having no axial opening into the open end of a socket housing, thereby closing the socket.

The socket housing designs set forth above and utilized with deformable or expanding cover-plates have limited socket wall thickness due to the design of the cover-plate step and the need to incorporate a fully-formed circumferential groove on the inner surface of the housing opening, adjacent the cover-plate step. Accordingly, it would be advantageous to provide a housing which does not require a reduction in wall thickness due to incorporation of a circumferential groove for capturing the cover-plate. Further, it would also be advantageous to provide a housing which can be utilized with deformable cover-plates, and which retains the low-profile top surface benefits of conventional spun or swaged housings, providing clearance for surrounding components after installation of the socket in a corresponding application. Still further, it would be advantageous to provide a socket housing with ductility sufficient to permit deformation of the top surface of the housing and the use of housing designs which have a low-profile top surface.

BRIEF SUMMARY OF THE INVENTION

Briefly stated, the present invention provides a socket for a ball and socket joint which uses a socket housing which does not require a fully formed circumferential groove to capture the cover-plate in the housing opening. The housing incorporates a housing wall of deformable material, preferably a ductile material, to provide a closure system utilizing a deformable cover-plate to achieve a consistent preload of the internal ball and socket components. The cover-plate is deformed onto a step within the housing opening, beyond an elastic limit, whereby the deformed cover plate exhibits a high-degree of repeatability and precise control of the preload of the ball and socket components during the assembly process. The deformed cover-plate is retained in the socket housing at the cover-plate seat by swaging or spin forming the deformable perimeter of the housing proximate the top surface to capture the perimeter of the cover plate within the housing opening.

In one aspect, the invention is a method for assembling a socket which includes the steps of inserting the socket components into the housing through a housing opening, disposing a deformable cover-plate on a circumferential seat within the socket opening, exerting a controlled load on the deformable cover-plate to take the cover-plate beyond an elastic limit, thereby flattening and expanding the cover-plate to a desired configuration on the seat within the housing opening and providing a controlled preload and associated internal clearance of the ball and socket components, and capturing the perimeter edge of the cover-plate within the housing socket by swaging or spin forming a perimeter lip of the housing over the perimeter of the cover-plate, thereby retaining the socket components in the housing, and the cover-plate against the circumferential seat within the housing opening. Advantageously, the sequencing of the steps associated with deformation of the cover-plate and capturing the perimeter edge of the cover-plate by swaging or spin forming a perimeter lip may be reversed.

It is a further advantage of the method of the present invention that the housing may be formed with a straight counter bore and does not require the formation of a separate circumferential groove as has been utilized with prior methods of forming sockets.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 1 is an exploded sectional view of one illustrative embodiment of the constituent parts of a movable socket assembly of the present invention prior to assembly;

FIG. 2 is a sectional view of the constituent parts of the moveable socket assembly of FIG. 1 following assembly of the socket;

FIG. 3 is a sectional view illustrating two embodiments of an assembly tool for use in accordance with the present invention;

Corresponding reference numerals indicate corresponding parts throughout the several figures of the drawings.

DESCRIPTION OF THE PREFERRED EMBODIMENT

Figure 4A:
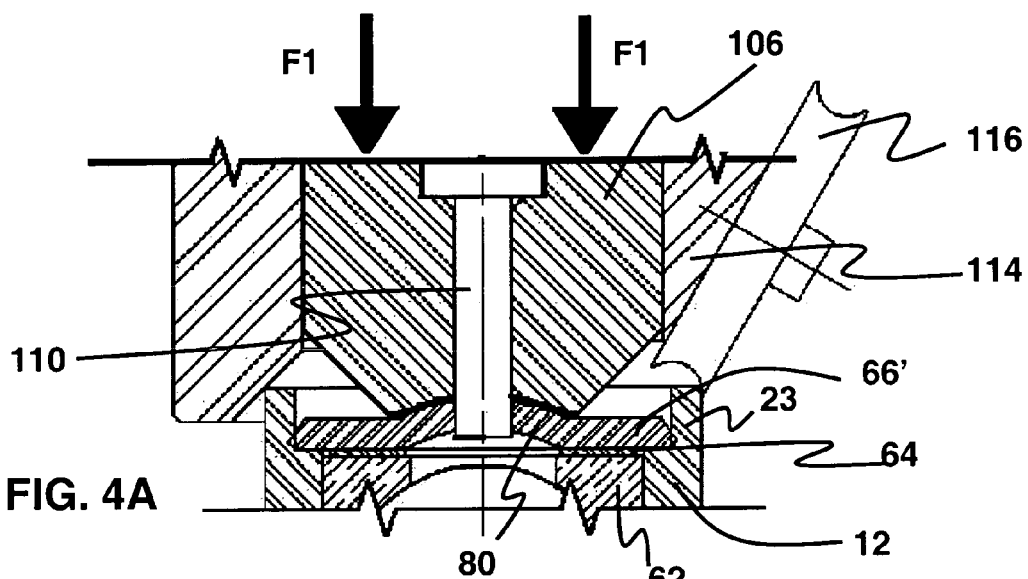
FIGS. 4A-4C are cross-sectional views illustrating a sequence of steps in accordance with one embodiment of the method of the present invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Those skilled in the art will readily recognize the applicability of the following method to the assembly of a variety of different movable sockets; to facilitate the description of the method and devices used in conjunction therewith, the preferred embodiment of present invention is described in reference to various ball and socket joints, such as ball-joint 10, shown in FIG. 3, but is not limited to use therewith.

As shown in FIGS. 1 and 2, housing 12, within which the various internal ball and socket components of the ball-joint 10 are enclosed, is generally cylindrical, with a central bore 14 of non-uniform radius having a posterior opening 16 and an anterior opening 18. The radius R of central bore 14 decreases to define a curved surface 20 at the base of the housing, adjacent anterior opening 18. A counterbore 22 having a seat 24 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of ball-joint 10 to other components (not shown). As may be appreciated, the ridge 28 also may be adapted for other specific kinds of installations employing threads or other connectors (not shown).

To assemble the ball and socket components of ball-joint 10, a first or lower bearing 30 sized to fit within central bore 14 is seated within housing 12. First bearing 30 includes a central bore 32 axially aligned with a vertical axis VA of the housing. A curved outer surface 34 of first bearing 30 is designed to correspond to the curvature of surface 20 in housing 12.

Next, a stud 36 having a generally cylindrical body 38 and an enlarged head portion 40 with a circumferential flange 42 is passed through central bores 32 and 14, such that the underside 44 of flange 42 rests on an upper surface 46 of first bearing 30 when both first bearing 30 and stud 36 are seated within housing 12. Body 38 includes a uniform diameter upper portion 50 adjacent flange 42 which transitions to a tapered central portion 52, which in turn transitions to lower portion 54 of a narrow uniform diameter. The upper portion 50 is sized to fit within central bore 32 of bearing 30, with the central portion 52 and lower portion 54 extending through anterior opening 18, externally of housing 12. Head portion 40 includes a hemispherical surface 56 with a radius $R^h$ greater than that of upper portion 50, but less than radius R of the housing 12. When assembled, the hemispherical surface 56 and the curved outer surface 34 define a generally spherical unit or ball within housing 12, allowing for pivoting or conical movement of stud 36.

Those skilled in the art will readily recognize that numerous shapes and configurations for stud 36 and first bearing 30 are possible. For example, stud 36 may include a generally spherical head, as shown in FIGS. 4A-C and 5A-C, eliminating the need for first bearing 30 altogether, or necessitating that first bearing 30 have a generally spherical bore which is operative to act as a bearing surface for the generally spherical head of stud 36, or cylindrical body 38 may include threads (not shown), bores as at 58, or grooves as at 60, for attachment of external components (not shown).

Once stud 36 and bearing 30 are seated within housing 12, a second bearing or upper bearing in the form of pressure plate 62 and a preload device 64, such as cushion preload device 64, are placed within central bore 14, above hemispherical surface 56, and secured therein by a deformable cover-plate 66. The pressure plate 62 sits on top of stud 36, and includes a bearing surface 68, an aperture 70, and is preferably in the form of a curved indentation having a radius of curvature corresponding to Rh. The preload device 64 sits, in turn, on an upper surface 72 of pressure plate 62, and when assembled serves to hold pressure plate 62 in place against the stud 36 by applying a controlled preload or spring force, while simultaneously permitting small movements of the ball within the socket in response to the pivoting or conical movement of stud 36. Cushion preload device 64 may comprise a cylindrical body 74, having an axial passage 76. As illustrated in FIG. 3, preload device may also comprise a belleville washer 64.

Finally, a cover-plate 66, shown in an initial conical or domed configuration in FIG. 1, is placed above cushion probed device 64 adjacent counter-bore 22, for vertical compression and minimal lateral expansion as will be described, on the circumferential seat 24 and enclose the various components within housing 12. To facilitate the insertion of the cover-plate 66 within posterior opening 16 of housing 12, the cover-plate 66 includes a circumferential rim 78 having an outer diameter OD sized to fit within counterbore 22 such that it rests on circumferential seat 24. The cover-plate 66 preferably has a low-profile conical or convex configuration, such that the outer diameter OD will be slightly less than and fit within the diameter (CD) of counterbore 22 and have a limited amount of expansion on seat 24. The preferred low-profile conical or convex configuration will be selected depending on the materials selected for cover-plate 66 so as to limit the expansion of the cover-plate on seat 24 and a void exerting force on housing 12 sufficient to cause cracking or excessive deformation of housing 12 adjacent to cover-plate 66 once it has been deformed. The low-profile conical or convex configuration will be generally less than conical configurations utilized for prior ball and socket joints which utilized a circumferential groove to capture the outer edge of the cover-plate and require significant radial expansion of the conical cover-plate, and thus require a cone angle alpha of about 35° in contrast, the low-profile configuration which may be utilized in accordance with the present invention can incorporate a cone angle α of less than about 35°. In one example, a cone angle alpha of about 20° was utilized and provided sufficient material for deformation of cover-plate 66 into a dome shape while also achieving minimal radial expansion of cover-plate 66 in conjunction with the deformation. However, those of ordinary skill in the art will recognize that the particular shape and initial configuration of cover-plate 66 may be varied depending upon the material utilized for cover-plate 66, the dimensions of the seat 24 and the desired final configuration and shape of cover-plate 66 after installation. FIG. 1 illustrates the arrangement of the upper components 36, 62, 64, and 66 of ball-joint 10 prior to the assembly of ball-joint 10 and the deformation of cover-plate 66. The bearing surface 68 and curved surface 20 comprise a socket. When assembled, these surfaces and their corresponding components together with hemispherical surface 56 and curved outer surface 34 and their corresponding components comprise a ball and socket joint as ball-joint 10.

As indicated above, those skilled in the art will recognize that the various internal components of the moveable ball and socket joint 10 secured within housing 12 by cover-plate 66 may be varied in size and shape depending upon the particular application for which movable ball and socket joint 10 is designed, and accordingly, the above described ball-joint 10 is merely exemplary of one embodiment.

Referring to FIG. 3, ball-joint 10 may be made using a suitable forming apparatus 100, such as forming tool 100, for performing the steps according to the method of the invention. A forming tool 100 is essentially a two-staged forming die or tool. Forming tool 100 includes a central cover-plate forming portion 102 located about a central axis CA that is adapted for alignment with vertical axis VA of ball-joint 10 in an assembled arrangement prior to the deformation of cover-plate 66. Positioned outwardly of central portion 102 about central axis CA there is located an outer perimeter lip forming portion 104. Central portion 102 is generally adapted for and operative to form cover-plate 66 into its desired configuration, as further described herein. Outer portion 104 is generally adapted for and operative to deform sidewall 23 to form deformed perimeter lip 25. Central portion 102 includes a forming die 106 which has a forming surface 108. Central portion 102 has an associated means (not shown) for applying a forming load or force F1 which is sufficient to deform cover-plate 66 into a desired configuration as deformed cover-plate 66'. Forming surface 108 is shaped so as to provide the desired configuration of the deformed cover-plate 66', such as a hemispherical or dome shape. Central portion 102 may also include a center punch 110 which is located within and extends from forming die 106 and is also aligned along central axis CA. Center punch 110 is adapted for and operative to define and maintain a bore 67', preferably a center bore, in deformed cover-plate 66' by the insertion of extended tip 111 into bore 67, preferably a center bore, located in cover-plate 66 during the deformation of cover-plate 66. Outer portion 104 includes a forming member 112 at a lower end 114. In the illustrative and schematic illustration of FIG. 3, two alternate types of forming members 112 are illustrated. The right side of the illustration of FIG. 3 illustrates forming member 112 as a rotatable forming wheel 116, such as may be utilized for spin forming of sidewall 23, as described further herein. The left side of the illustration of FIG. 3 illustrates forming member 112 as a circumferential chamfer 118 formed in lower end 114 of outer portion 104, such as may be utilized for crimping or swaging of sidewall 23, as also described further herein. Outer portion 104 also has an associated means (not shown) for applying a forming load or force F2 which is sufficient to deform sidewall 23 and form deformed perimeter lip 25. In the case where forming tool 100 incorporates forming wheel 116, one of the forming tool 100 and fixture (not shown) used to hold ball-joint 10 is adapted for rotation while forming force F2 is applied in order that forming wheel 116 may be used to deform sidewall 23 to form perimeter lip 25. In the case where forming tool includes circumferential chamfer, the rotation of the tool or holding fixture is not necessary while forming force F2 is applied, as the circumferential chamfer 118 will naturally form a corresponding circumferential crimp or deformed perimeter lip 25. Central portion 102 and outer portion 104 of may be constructed and arranged so as to be operated completely independently of one another, or preferably may be constructed and arranged so as to be operated in a predetermined and coordinated sequence, as further described herein. As will be readily understood, control of forming tool 100, including central portion 102 and outer portion 104, may be exercised manually or through the use of well-known automated die and die forming controls.

Figure 4B:
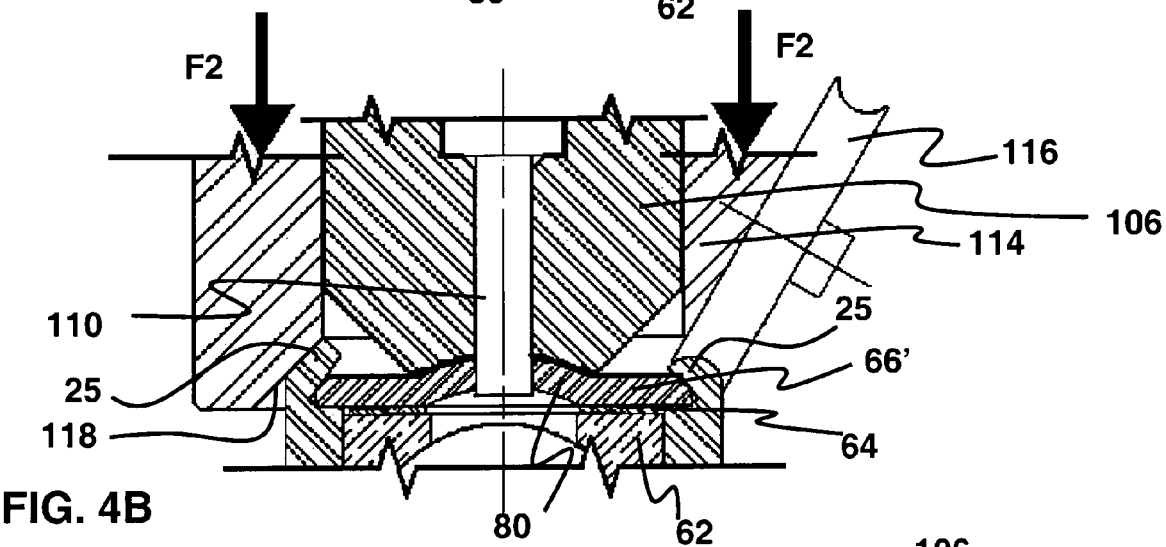
Figure 4C:
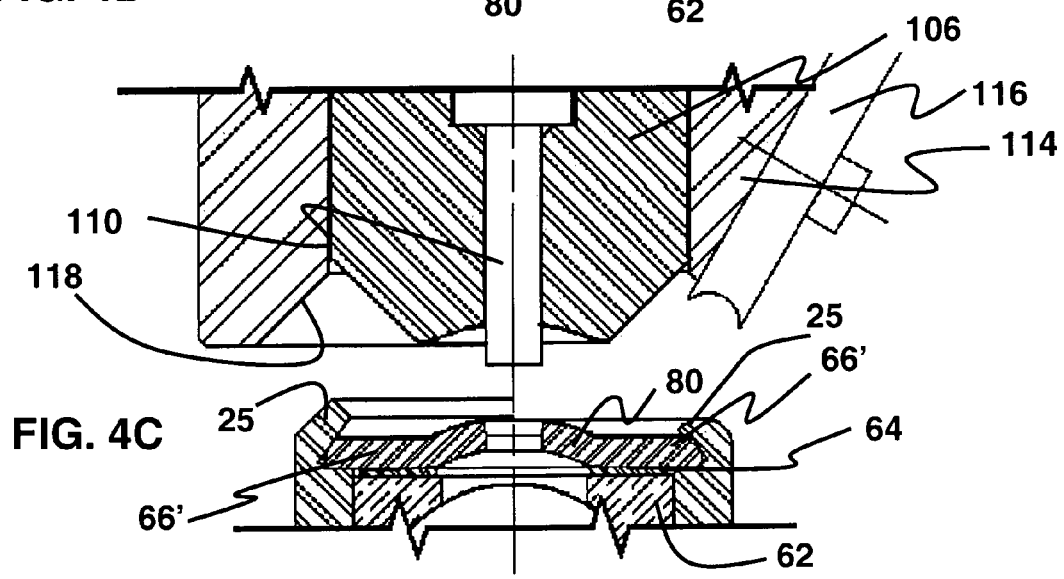

Turning now to FIGS. 4A-4C, a first embodiment of a method of the present invention for assembling a socket includes the initial step of inserting the aforementioned ball and socket components into housing 12 through housing opening 16 to an initial preassembly configuration as shown generally in FIG. 3, or as may be obtained by inserting the components shown in FIG. 1 into housing 12, as described herein. This includes the steps of providing a housing 12 having a central bore 14, the central bore 14 including at least one open end 16 having a counterbore 22 defining a circumferential seat 24 adjacent said open end 16; providing one or more joint components, such as first bearing 30, second bearing 62 and preload device 64, and including stud 36; providing a deformable cover-plate 66, the cover-plate 66 having an outer diameter OD sized to seat within the counterbore 22 on the circumferential seat 24, inserting the stud 36 and joint components into the central bore 14; and placing the cover-plate 66 over the joint components at the open end 16 of the central bore 14 with the cover-plate 66 seating on the circumferential seat 24. With the ball and socket components of ball-joint 10 disposed in housing 12, deformable cover-plate 66 is seated on the circumferential seat 24 within the housing opening 16, and a controlled load F1 is exerted on deformable cover-plate 66 through forming die 106 (and the action of forming surface 108) and center punch 110 to take the cover-plate 66 beyond an elastic limit, thereby flattening and minimally expanding the cover-plate 66 to a desired and finished configuration 66' (see FIG. 4A) within the housing opening 16 and counterbore 22. This action also applies a preload to the components of ball-joint 10, and in particular to compress preload device 64, whether in the form of cushion preload device 64 (see FIGS. 1 and 2), or in the form of belleville washer 64 (see FIG. 3). The compression of preload device 64 stores energy that is used to maintain a controlled loading of the components ball-joint 10 following the assembly of ball-joint 10 which essential to the subsequent operation of ball-joint 10 in its intended applications.

By a desired configuration, it is meant that during the deformation process associated with cover-plate 66, the outer-diameter OD of the cover-plate 66 is expanded and plastically deformed only by a limited amount sufficient to retain the cover-plate 66' in place against the circumferential seat 24 and to hold the internal socket components in place until the assembly process is completed. The OD may be radially expanded so as to press against the surface of counterbore 22 so long as the resultant force is not sufficient to damage or distort housing 12, but it is not necessary that cover-plate 66 be expanded sufficiently to contact counterbore 22. The desired configuration also preferably has a portion of deformed cover-plate 66' having a generally arcuate section 80 that may extend above the upper portion of housing 12, such as a dome shape. This generally arcuate shaped portion 67 may serve to define part of an enclosure for receiving grease within the ball and socket joint 10. With deformed cover-plate 66' deformed and expanded to press against the surface of counterbore 22 to enclose the housing opening 16, the perimeter edge 65 of the cover-plate is captured within the housing 12 by swaging the sidewall 23 of housing 12 adjacent to counterbore 22 to form a deformed perimeter lip 25 (see FIG. 6) of the housing 12 over the perimeter of the deformed and expanded cover-plate 66', thereby retaining the socket components in housing 12, and cover-plate 66' against the circumferential seat 24 within housing opening 16.

Following the step of inserting the aforementioned ball and socket components into housing 12 through housing opening 16 to an initial preassembly configuration, FIG. 4B illustrates the step of deforming the circumferential sidewall 23 of the housing 12 adjacent to the counterbore in a radially inward direction, thereby forming a deformed perimeter lip 25 and capturing a perimeter edge 65 of said cover-plate; wherein the stud 36 and joint components are retained within the central bore 14 by the captured and deformed cover-plate 66'. Deformation may be accomplished either through the use of spin forming by using forming wheel 116, or by crimping or swaging using chamfered forming die 118, as described herein. If housing 12 is formed from steel or a deformable cast iron alloy deformed perimeter lip 25 will have a cold-worked microstructure and mechanical properties characteristics of such structures.

FIG. 4C illustrates the assembled ball-joint 10 following application of the method of the invention described above, including a desired configuration of deformed cover-plate 66'.

Figure 5A:
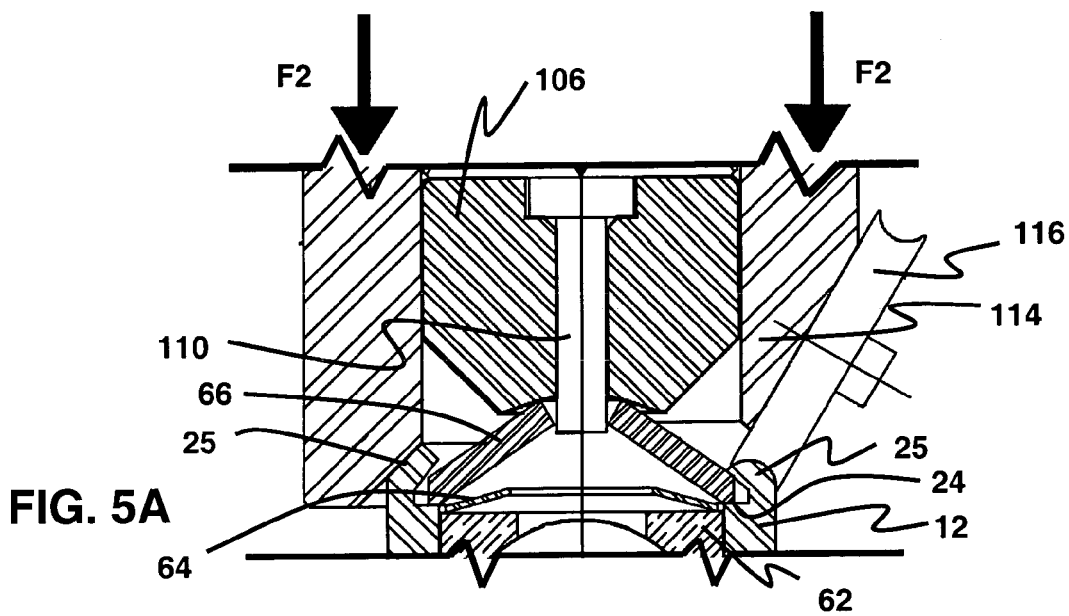
FIGS. 5A-5C are cross-sectional views illustrating a sequence of steps in accordance with a second embodiment of the present invention.
Figure 5B:
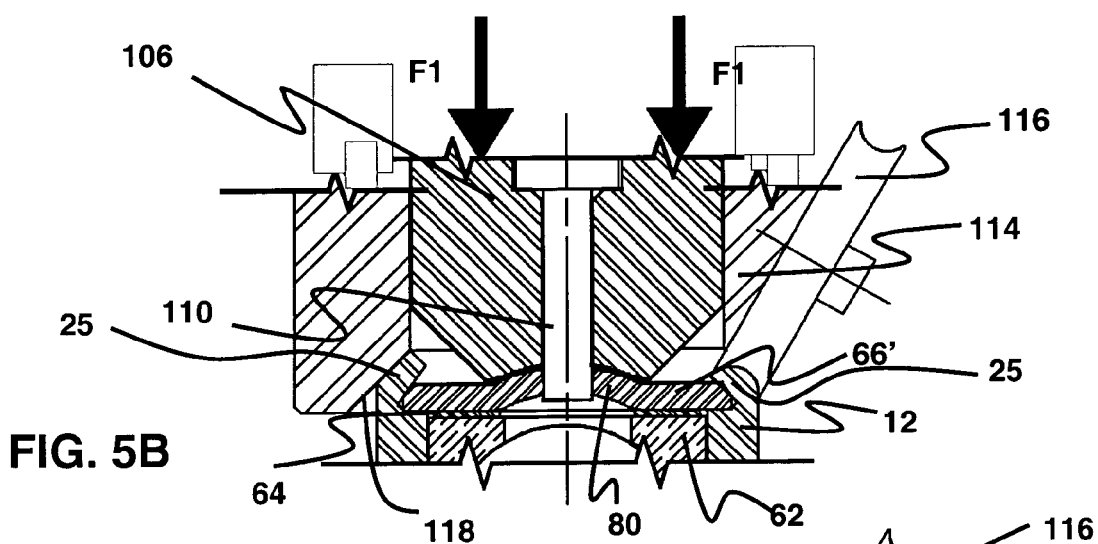
Figure 5C:
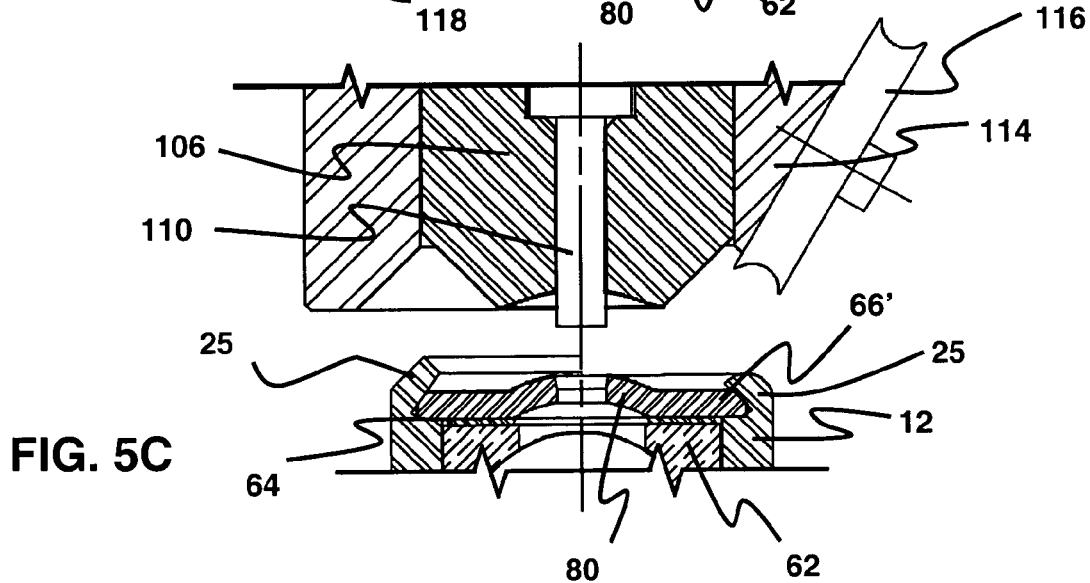

Turning now to FIGS. 5A-5C, a second embodiment of the method of the present invention for assembling a socket includes the initial step of inserting the aforementioned ball and socket components into housing 12 through housing opening 16 to an initial preassembly configuration as shown generally in FIG. 3, or as may be obtained by inserting the components shown in FIG. 1 into housing 12, as described herein. This includes the steps of providing a housing 12 having a central bore 14, the central bore 14 including at least one open end 16 having a counterbore 22 defining a circumferential seat 24 adjacent said open end 16; providing one or more joint components, such as first bearing 30, second bearing 62 and preload device 64, and including stud 36; providing a deformable cover-plate 66, the cover-plate 66 having an outer diameter OD sized to seat within the counterbore 22 on the circumferential seat 24, inserting the stud 36 and joint components into the central bore 14; and placing the cover-plate 66 over the joint components at the open end 16 of the central bore 14 with the cover-plate 66 seating on the circumferential seat 24.

As illustrated in FIG. 5B, with the socket components captured in housing 12 by the deformation of sidewall 23 and the formation of inwardly extending deformed perimeter lip 25 (FIG. 5A), deformable cover-plate 66 is seated on the circumferential seat 24 within the housing opening 16, and a controlled load F1 is exerted on deformable cover-plate 66 through forming die 106 (and the action of forming surface 108) and center punch 110 to take the cover-plate 66 beyond an elastic limit, thereby flattening and minimally expanding the cover-plate 66 to a desired and finished configuration 66' within the housing opening 16 and counterbore 22. This action also applies a preload to the components of ball-joint 10, and in particular to compress preload device 64, whether in the form of cushion preload device 64 (see FIGS. 1 and 2), or in the form of belleville washer 64 (see FIG. 3). The compression of preload device 64 stores energy that is used to maintain a controlled loading of the components ball-joint 10 following the assembly of ball-joint 10 which essential to the subsequent operation of ball-joint 10 in its intended applications. By a desired configuration, it is meant that during the deformation process, the outer-diameter OD of the cover-plate 66 is expanded and plastically deformed only by a limited amount sufficient to retain the deformed cover plate 66' in place against the circumferential seat 24 and to hold the internal socket components in place until the assembly process is completed. The desired configuration also preferably provides deformed cover-plate 66' with a generally arcuate section 80 that may extend above the upper portion of housing 12, and may serve to define part of an enclosure for receiving grease within the socket. Deformed cover-plate 66' may be deformed and expanded sufficiently to press against the surface of counterbore 22 to further enclose or seal housing opening 16, but this degree of expansion of the OD is not required.

Figure 6:
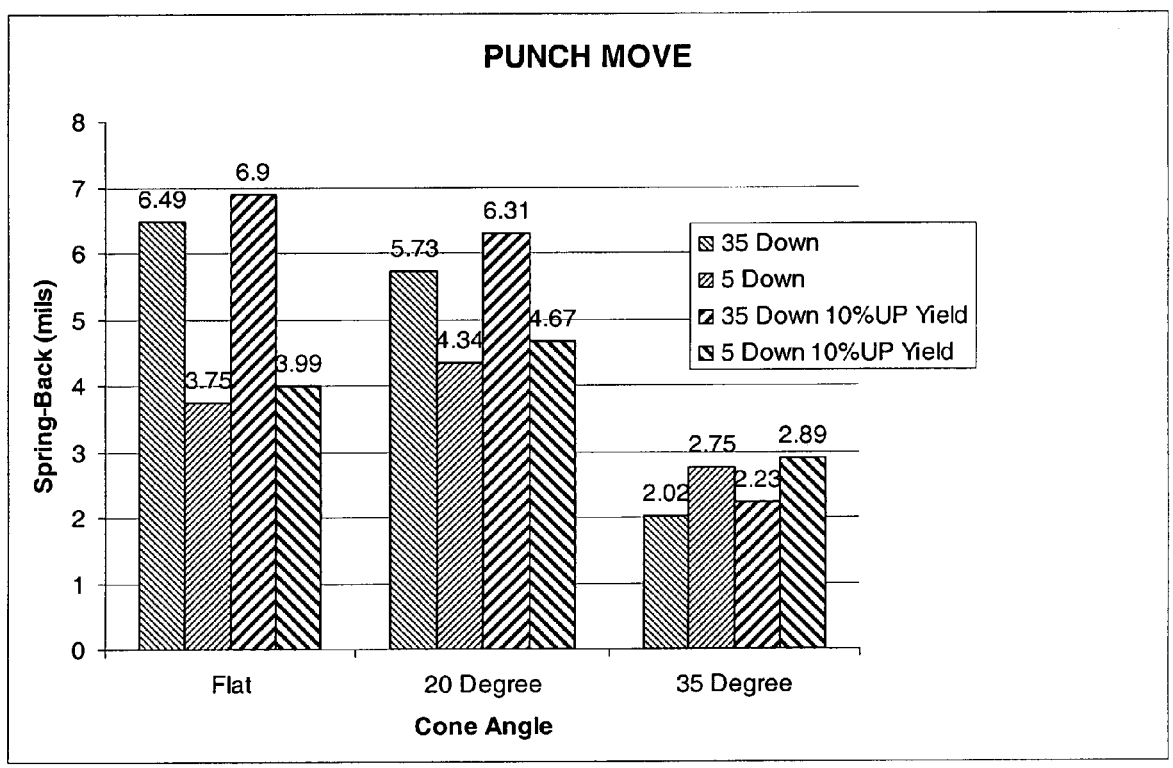
FIG. 6 is a chart relating various aspects of the spring-back of the cover-plate and components of the socket in conjunction with this step of deforming the cover-plate in accordance with the method of the invention.

By taking the deformable cover-plate 66 beyond an elastic limit of the cover-plate material during closure of ball-joint 10 and thereby inducing plastic deformation to produce deformed cover-plate 66', a consistent internal socket preload and associated internal clearance of the stud and joint components is achieved which is highly repeatable for each deformed cover-plate 66' and ball-joint 10 of the same configuration. This improvement assures acceptable and repeatable performance of the socket for its intended applications. This has been verified by finite element modeling as illustrated in FIG. 6. In this modeling, several configurations of the cover-plate 66 were modeled using materials having two different yield points. Material 1 and material 2 were identical, except that material 2 had a yield point which was 10% greater than the yield point of material 1. The model also considered two different configurations or conditions of the internal components of the joints. Condition 1 represented a minimum condition based on the allowed dimensional variability of the components, and was set such that the components were located approximately 0.035 inches below the circumferential seat 24. Condition 2 represented a maximum condition, and was set such that the components were located approximately 0.005 inches below the circumferential seat 24. The model determined the expected amount of spring-back of cover-plate 66' following deformation and the removal of central portion 102. The flat or 0° cone angle condition and 35° cone angle condition represent related art approaches for forming ball-joint 10, with the 0° cone angle condition representative of a flat cover-plate having a swaged or spin-formed perimeter lip, and the 35° cone angle representative of a deformed cover-plate which is deformed into a circumferential groove in housing 12 for capture of the cover-plate and sealing of the socket. The 20° cone angle condition is representative of a socket of the present invention. In particular, the socket of the present invention has significantly reduced variability (i.e., minimum spring-back as compared with maximum spring-back considering both material and tolerance stack conditions) over the socket formed using a flat cover plate. It is believed that this is due to the increased plastic deformation of the cover-plate associated with the use of a conical or convex cover plate.

Utilizing the swaging or spin forming closure methods to retain deformed cover-plate 66' within the housing opening 16 further provides for greater clearance around the top portion of the socket housing 12, by reducing the overall height of the housing portions projecting above the surface of the deformed and expanded cover-plate 66', thereby providing more room for adjacent components when ball-joint 10 is installed in a suitable application. Additionally, by eliminating the need for a circumferential groove in the housing posterior opening, thicknesses of the housing wall need not be increased to retain desired strength characteristics, thereby simplifying the manufacturing process.

Obviously, many modifications and variations of the present invention are possible in light of the above teachings. It is, therefore, to be understood that within the scope of the appended claims, the invention may be practiced otherwise than as specifically described.

What is claimed is:

1. A method of forming a socket, the method comprising:
   providing a housing having a central bore, the central bore including at least one open end having a counterbore defining a circumferential seat adjacent said open end;
   providing one or more joint components, including a stud;
   providing a deformable cover-plate, said cover-plate having an outer diameter sized to seat within said counterbore on said circumferential seat;
   inserting said stud and joint components into said central bore;
   placing said cover-plate over said joint components at said open end of said central bore, said cover-plate seating on said circumferential seat;
   applying a controlled load to said cover-plate, said controlled load plastically deforming said cover plate into a desired configuration and engaging said cover-plate into pressed contact with said circumferential seat; and
   deforming a circumferential sidewall of said housing adjacent to said counterbore in a radially inward direction, capturing a peripheral edge of said cover-plate;
   wherein said stud and joint components are retained within said central bore by said captured and deformed cover-plate.

2. The method of claim 1 for forming a socket wherein said deforming step includes swaging said circumferential perimeter of said counterbore.

3. The method of claim 1 for forming a socket wherein said deforming step includes spin forming said circumferential perimeter of said counterbore.

4. The method of claim 1 for forming a socket where said applying step includes applying sufficient controlled load to said cover-plate to exceed an elastic limit of said cover-plate, whereby said cover-plate exhibits predictable deformation characteristics.

5. The method of claim 1 for forming a socket wherein said cover-plate deformation is controlled to achieve a desired internal clearance for said stud and joint components within said central bore.

6. The method of claim 1 for forming a socket wherein said housing is formed of a material having sufficient flexibility to permit closure of said housing over said cover-plate.

7. A method of forming a socket, the method comprising:
   providing a housing having a central bore, the central bore including at least one open end having a counterbore defining a circumferential seat adjacent said open end;
   providing one or more joint components, including a stud;
   providing a deformable cover-plate, said cover-plate having an outer diameter sized to seat within said counterbore on said circumferential seat;
   inserting said stud and joint components into said central bore;
   placing said cover-plate over said joint components at said open end of said central bore, said cover-plate seating on said circumferential seat;
   deforming a circumferential sidewall of said housing adjacent to said counterbore in a radially inward direction, capturing a peripheral edge of said cover-plate; and
   applying a controlled load to said captured cover-plate, said controlled load plastically deforming said captured cover plate into a desired configuration and engaging said captured cover-plate into pressed contact with said circumferential seat;
   wherein said stud and joint components are retained within said central bore by said captured and deformed cover-plate.

8. The method of claim 7 for forming a socket wherein said deforming step includes swaging said circumferential perimeter of said counterbore.

9. The method of claim 7 for forming a socket wherein said deforming step includes spin forming said circumferential perimeter of said counterbore.

10. The method of claim 7 for forming a socket where said applying step includes applying sufficient controlled load to said cover-plate to exceed an elastic limit of said cover-plate, whereby said cover-plate exhibits predictable deformation characteristics.

11. The method of claim 7 for forming a socket wherein said cover-plate deformation is controlled to achieve a desired internal clearance for said stud and joint components within said central bore.

12. The method of claim 7 for forming a socket wherein said housing is formed of a material having sufficient flexibility to permit closure of said housing over said cover-plate.

* * * * *